United States Patent
Jacobs, II et al.

(10) Patent No.: US 11,537,765 B1
(45) Date of Patent: Dec. 27, 2022

(54) PLACEMENT AND PRICING OF PART MARKS IN COMPUTER-MODELED STRUCTURES

(71) Applicant: Benko, LLC, New London, NH (US)

(72) Inventors: James L. Jacobs, II, Amherst, NH (US); John E. Cronin, Bonita Springs, FL (US); Kyle W. Kulp, Burlington, VT (US); Steven M. Lynch, Hudson, NH (US)

(73) Assignee: Benko, LLC, New London, NH (US)

( * ) Notice: Subject to any disclaimer, the term of this patent is extended or adjusted under 35 U.S.C. 154(b) by 343 days.

(21) Appl. No.: 14/185,204

(22) Filed: Feb. 20, 2014

(51) Int. Cl.
*G06F 30/17* (2020.01)
*G06Q 30/02* (2012.01)

(52) U.S. Cl.
CPC ......... *G06F 30/17* (2020.01); *G06Q 30/0283* (2013.01)

(58) Field of Classification Search
CPC .................. G06Q 30/0611; G06F 3/04842
USPC ....................................................... 705/400
See application file for complete search history.

(56) References Cited

U.S. PATENT DOCUMENTS

| | | | |
|---|---|---|---|
| 4,495,559 A | 1/1985 | Gelatt, Jr. et al. | |
| 5,117,354 A | 5/1992 | Long | |
| 5,465,221 A | 11/1995 | Merat et al. | |
| 5,495,430 A | 2/1996 | Matsunari et al. | |
| 5,552,995 A | 9/1996 | Sebastian | |
| 5,570,291 A | 10/1996 | Dudle et al. | |
| 5,655,087 A | 8/1997 | Hino et al. | |
| 5,758,328 A | 5/1998 | Giovannoli | |
| 5,847,971 A | 12/1998 | Ladner et al. | |
| 5,870,719 A | 2/1999 | Maritzen et al. | |
| 5,937,189 A | 8/1999 | Branson et al. | |
| 6,031,535 A | 2/2000 | Barton | |
| 6,112,133 A | 8/2000 | Fishman | |
| 6,295,513 B1 | 9/2001 | Thackston | |
| 6,341,271 B1 | 1/2002 | Salvo et al. | |

(Continued)

FOREIGN PATENT DOCUMENTS

| | | | |
|---|---|---|---|
| WO | 154476 A2 | 8/2001 | |
| WO | 171626 A2 | 9/2001 | |

(Continued)

OTHER PUBLICATIONS

Dassault Systemes, Brochure, Mar. 24, 2010: New Features Type3ToCatia http://www.type3.us/content/download/2202/405535/file/New%20Feature_Type3ToCatia_2010_US%20old.pdf.*

(Continued)

*Primary Examiner* — Shannon S Campbell
*Assistant Examiner* — Bryan J Kirk
(74) *Attorney, Agent, or Firm* — Caldwell Intellectual Property Law

(57) ABSTRACT

Systems, methods, and software for placing, customizing, and pricing part marks for use in one or more part designs that are represented in a computer model. Placement may be performed as a function of particular locations of part designs. Users may customize part marks by determining particular attributes thereof, such as textual content, font, and/or manufacturing method, among others. A user may manipulate a graphical user interface in order to determine various attributes that further define part mark. Pricing may be performed as a function of user-determined attributes and/or data from one or more pricing catalogs.

18 Claims, 6 Drawing Sheets

(56) References Cited

U.S. PATENT DOCUMENTS

| | | |
|---|---|---|
| 6,343,285 B1 | 1/2002 | Tanaka et al. |
| 6,611,725 B1 | 8/2003 | Harrison |
| 6,647,373 B1 | 11/2003 | Calton-Foss |
| 6,701,200 B1 | 3/2004 | Lukis et al. |
| 6,750,864 B1 | 6/2004 | Anwar |
| 6,834,312 B2 | 12/2004 | Edwards et al. |
| 6,836,699 B2 | 12/2004 | Lukis et al. |
| 6,859,768 B1 | 2/2005 | Wakelam et al. |
| 6,922,701 B1 | 6/2005 | Ananian et al. |
| 6,917,847 B2 | 7/2005 | Littlejohn et al. |
| 7,006,084 B1 | 2/2006 | Buss et al. |
| 7,058,465 B2 | 6/2006 | Emori et al. |
| 7,065,420 B1 * | 6/2006 | Philpott ............... G06Q 30/02 700/97 |
| 7,079,990 B2 | 7/2006 | Haller et al. |
| 7,085,687 B2 | 8/2006 | Eckenwiler et al. |
| 7,089,082 B1 | 8/2006 | Lukis et al. |
| 7,123,986 B2 | 10/2006 | Lukis et al. |
| 7,134,096 B2 | 11/2006 | Brathwaite et al. |
| 7,299,101 B2 | 11/2007 | Lukis et al. |
| 7,305,367 B1 * | 12/2007 | Hollis ................ G06Q 30/0283 700/157 |
| 7,327,869 B2 | 2/2008 | Boyer |
| 7,343,212 B1 | 3/2008 | Brearley et al. |
| 7,359,886 B2 | 4/2008 | Sakurai et al. |
| 7,366,643 B2 | 4/2008 | Verdura et al. |
| 7,369,970 B2 | 5/2008 | Shimizu et al. |
| 7,418,307 B2 | 8/2008 | Katircioglu |
| 7,467,074 B2 | 12/2008 | Faruque et al. |
| 7,496,487 B2 | 2/2009 | Wakelam et al. |
| 7,496,528 B2 | 2/2009 | Lukis et al. |
| 7,499,871 B1 | 3/2009 | McBrayer et al. |
| 7,523,411 B2 | 4/2009 | Carlin |
| 7,526,358 B2 | 4/2009 | Kawano et al. |
| 7,529,650 B2 | 5/2009 | Wakelam et al. |
| 7,565,139 B2 | 7/2009 | Neven, Sr. et al. |
| 7,565,223 B2 | 7/2009 | Moldenhauer et al. |
| 7,567,849 B1 | 7/2009 | Trammell et al. |
| 7,568,155 B1 | 7/2009 | Axe et al. |
| 7,571,166 B1 | 8/2009 | Davies et al. |
| 7,574,339 B2 | 8/2009 | Lukis et al. |
| 7,590,466 B2 | 9/2009 | Lukis et al. |
| 7,590,565 B2 | 9/2009 | Ward et al. |
| 7,603,191 B2 | 10/2009 | Gross |
| 7,606,628 B2 | 10/2009 | Azuma |
| 7,630,783 B2 | 12/2009 | Walls-Manning et al. |
| 7,656,402 B2 | 2/2010 | Abraham et al. |
| 7,689,936 B2 * | 3/2010 | Rosel ................ G06F 3/04842 715/822 |
| 7,733,339 B2 | 6/2010 | Laning et al. |
| 7,747,469 B2 | 6/2010 | Hinman |
| 7,748,622 B2 | 7/2010 | Schon et al. |
| 7,761,319 B2 | 7/2010 | Gil et al. |
| 7,822,682 B2 | 10/2010 | Arnold et al. |
| 7,836,573 B2 | 11/2010 | Lukis et al. |
| 7,840,443 B2 | 11/2010 | Lukis et al. |
| 7,908,200 B2 | 3/2011 | Scott et al. |
| 7,957,830 B2 | 6/2011 | Lukis et al. |
| 7,979,313 B1 | 7/2011 | Baar |
| 7,993,140 B2 | 8/2011 | Sakezles |
| 8,000,987 B2 | 8/2011 | Hickey et al. |
| 8,024,207 B2 | 9/2011 | Ouimet |
| 8,140,401 B2 | 3/2012 | Lukis et al. |
| 8,170,946 B2 | 5/2012 | Blair et al. |
| 8,175,933 B2 | 5/2012 | Cook, Jr. et al. |
| 8,180,396 B2 | 5/2012 | Athsani et al. |
| 8,209,327 B2 | 6/2012 | Danish et al. |
| 8,239,284 B2 | 8/2012 | Lukis et al. |
| 8,249,329 B2 | 8/2012 | Silver |
| 8,271,118 B2 | 9/2012 | Pietsch et al. |
| 8,275,583 B2 | 9/2012 | Devarajan et al. |
| 8,295,971 B2 | 10/2012 | Krantz |
| 8,417,478 B2 | 4/2013 | Gintis et al. |
| 8,441,502 B2 | 5/2013 | Reghetti et al. |
| 8,515,820 B2 | 8/2013 | Lopez et al. |
| 8,554,250 B2 | 10/2013 | Linaker |
| 8,571,298 B2 | 10/2013 | McQueen et al. |
| 8,595,171 B2 | 11/2013 | Qu |
| 8,700,185 B2 | 4/2014 | Yucel et al. |
| 8,706,607 B2 | 4/2014 | Sheth et al. |
| 8,768,651 B2 | 7/2014 | Bhaskaran et al. |
| 8,798,324 B2 | 8/2014 | Conradt |
| 8,806,398 B2 | 8/2014 | Brathwaite et al. |
| 8,830,267 B2 | 9/2014 | Brackney |
| 8,849,636 B2 | 9/2014 | Becker et al. |
| 8,861,005 B2 | 10/2014 | Grosz |
| 8,874,413 B2 | 10/2014 | Mulligan et al. |
| 8,923,650 B2 | 12/2014 | Wexler |
| 8,977,558 B2 | 3/2015 | Nielsen et al. |
| 9,037,692 B2 | 5/2015 | Ferris |
| 9,055,120 B1 | 6/2015 | Firman |
| 9,106,764 B2 | 8/2015 | Chan et al. |
| 2001/0023418 A1 * | 9/2001 | Suzuki ................ G06F 30/00 705/400 |
| 2001/0047251 A1 | 11/2001 | Kemp |
| 2002/0065790 A1 | 5/2002 | Oouchi |
| 2002/0087440 A1 | 7/2002 | Blair et al. |
| 2002/0099579 A1 | 7/2002 | Stowell et al. |
| 2002/0107673 A1 | 8/2002 | Haller et al. |
| 2002/0152133 A1 | 10/2002 | King et al. |
| 2003/0018490 A1 | 1/2003 | Magers et al. |
| 2003/0035138 A1 * | 2/2003 | Schilling ............ G06Q 10/087 358/1.15 |
| 2003/0069824 A1 | 4/2003 | Menninger |
| 2003/0078846 A1 | 4/2003 | Burk et al. |
| 2003/0139995 A1 | 7/2003 | Farley |
| 2003/0149500 A1 | 8/2003 | Faruque et al. |
| 2003/0163212 A1 | 8/2003 | Smith et al. |
| 2003/0172008 A1 | 9/2003 | Hage et al. |
| 2003/0212610 A1 | 11/2003 | Duffy et al. |
| 2003/0220911 A1 | 11/2003 | Tompras |
| 2004/0008876 A1 | 1/2004 | Lure |
| 2004/0113945 A1 | 6/2004 | Park et al. |
| 2004/0195224 A1 | 10/2004 | Kanodia et al. |
| 2005/0055299 A1 | 3/2005 | Chambers et al. |
| 2005/0094206 A1 * | 5/2005 | Tonisson ............ G06F 17/211 358/1.18 |
| 2005/0125092 A1 | 6/2005 | Lukis et al. |
| 2005/0144033 A1 | 6/2005 | Vreeke et al. |
| 2005/0171790 A1 | 8/2005 | Blackmon |
| 2005/0251478 A1 | 11/2005 | Yanavi |
| 2005/0273401 A1 | 12/2005 | Yeh et al. |
| 2006/0085322 A1 | 4/2006 | Crookshanks |
| 2006/0185275 A1 | 8/2006 | Yatt |
| 2006/0242630 A1 * | 10/2006 | Koike ................ G06F 40/56 717/136 |
| 2006/0253214 A1 * | 11/2006 | Gross ................ G06F 30/00 705/26.1 |
| 2007/0016437 A1 | 1/2007 | Elmufdi et al. |
| 2007/0067146 A1 | 3/2007 | Devarajan et al. |
| 2007/0073593 A1 | 5/2007 | Perry et al. |
| 2007/0112635 A1 | 5/2007 | Loncaric |
| 2007/0198231 A1 | 8/2007 | Walch |
| 2007/0203949 A1 * | 8/2007 | Regan ............... G06F 17/30879 |
| 2008/0120086 A1 | 5/2008 | Lilley et al. |
| 2008/0183614 A1 | 7/2008 | Gujral et al. |
| 2008/0269942 A1 * | 10/2008 | Free ................ G06F 17/50 700/182 |
| 2008/0281678 A1 | 11/2008 | Keuls et al. |
| 2009/0058860 A1 | 3/2009 | Fong et al. |
| 2009/0177293 A1 * | 7/2009 | Reginald ............ G06Q 30/0283 715/764 |
| 2009/0208773 A1 | 8/2009 | DuPont |
| 2009/0299799 A1 | 12/2009 | Racho et al. |
| 2009/0319388 A1 | 12/2009 | Yuan et al. |
| 2011/0040542 A1 | 2/2011 | Sendhoff et al. |
| 2011/0047140 A1 | 2/2011 | Free |
| 2011/0209081 A1 | 8/2011 | Chen et al. |
| 2011/0213757 A1 | 9/2011 | Bhaskaran et al. |
| 2012/0016678 A1 | 1/2012 | Gruber et al. |
| 2012/0072299 A1 | 3/2012 | Sampsell |
| 2012/0230548 A1 | 9/2012 | Calman et al. |
| 2012/0316667 A1 | 12/2012 | Hartloff |
| 2013/0055126 A1 | 2/2013 | Jackson |

(56) References Cited

U.S. PATENT DOCUMENTS

| | | | |
|---|---|---|---|
| 2013/0097259 A1* | 4/2013 | Li | G06Q 10/103 709/206 |
| 2013/0100128 A1 | 4/2013 | Steedly et al. | |
| 2013/0138529 A1 | 5/2013 | Hou | |
| 2013/0144566 A1 | 6/2013 | De Biswas | |
| 2013/0166470 A1 | 6/2013 | Grala et al. | |
| 2013/0218961 A1 | 8/2013 | Ho | |
| 2013/0293580 A1 | 11/2013 | Spivack | |
| 2013/0297320 A1 | 11/2013 | Buser | |
| 2013/0297460 A1 | 11/2013 | Spivack | |
| 2013/0311914 A1 | 11/2013 | Daily | |
| 2013/0325410 A1 | 12/2013 | Jung et al. | |
| 2014/0042136 A1 | 2/2014 | Daniel et al. | |
| 2014/0067333 A1 | 3/2014 | Rodney et al. | |
| 2014/0075342 A1 | 3/2014 | Corlett | |
| 2014/0098094 A1 | 4/2014 | Neumann et al. | |
| 2014/0108148 A1* | 4/2014 | Paul | G06Q 30/02 705/14.58 |
| 2014/0157579 A1 | 6/2014 | Chhabra et al. | |
| 2014/0207605 A1 | 7/2014 | Allin et al. | |
| 2014/0229316 A1 | 8/2014 | Brandon | |
| 2014/0279177 A1* | 9/2014 | Stump | G06Q 30/0611 705/26.4 |
| 2014/0379119 A1 | 12/2014 | Sciacchitano et al. | |
| 2015/0055085 A1 | 2/2015 | Fonte et al. | |
| 2015/0066189 A1 | 3/2015 | Mulligan et al. | |
| 2015/0127480 A1 | 5/2015 | Herrman et al. | |
| 2015/0234377 A1 | 8/2015 | Mizikovsky | |

FOREIGN PATENT DOCUMENTS

| | | |
|---|---|---|
| WO | 2001077781 A2 | 10/2001 |
| WO | 2006086332 A2 | 8/2006 |
| WO | 2007067248 A2 | 6/2007 |
| WO | 2011139630 A1 | 11/2011 |
| WO | 2011140646 | 11/2011 |
| WO | 2011140646 A1 | 11/2011 |
| WO | 2013058764 A1 | 4/2013 |
| WO | 2014152396 A2 | 9/2014 |

OTHER PUBLICATIONS

The Fabricator (http://www.thefabricator.com, Gerald Davis, Apr. 19, 2013, Step 4: Preparing the "work order") http://www.thefabricator.com/article/shopmanagement/job-shop-estimating-expenses-driven-by-events-in-the-fabrication-sequence.*
Kopier, Michelle, "Reduce manufacturing costs during the design phase!", Sep. 19, 2011, oemoffhighway.com, retrieved from https://www.oemoffhighway.com/engineering-manufacturing/software/article/10338973/solidworks-2012-costing-feature-cad-software (Year: 2011).*
Defining Lead Time for APS Planning; http://t3.apptrix.com/syteline/Language/en-US/Other/Process/Defining_Lead_Time.htm.
"Quartiles." Mathisfun.com. Web. <https://www.mathsisfun.com/data/quartiles.html>. Archive. https://web.archive.org/web/20100909011751/http://www.mathsisfun.com/data/quartiles.html>.
Wu et al. Interactive 3D Geometric Modelers with 2D UI, 2002, State University of Campinas, www.dca.fee.unicamp.br, Sao Paulo, Brazil; 2002, 8 pages.
"Upload Your Photos, Print a 3D Model with hypr3D." SolidSmack. http://www.solidsmack.com/cad-design-news/hypr3d-photo-video-3d-print/; last accessed on Oct. 13, 2015.
"123D Catch." Autodesk. http://apps.123dapp.com/catch/.
Rothganger et al. "3D Object Modeling and Recognition from Photographs and Image Sequences." Toward Category-Level Object Recognition. 2006, pp. 105-126, vol. 4170 of the series Lecture Notes in Computer Science. Springer Berlin Heidelberg.
Dealer Information Systems Corporation. "Parts Inventory." http://dis-corp.com/content/agriculture/inventory/parts-inventory.
EMachineShop. "Emachineshop Features." http://www.emachineshop.com/machine-shop/Features/page518.html.
Retrieved from:http://www.solidworks.com/sw/products/3d-cad/manufacturing-cost-estimation-quoting.htm p. 1: Automatic Manufacturing Cost Estimation Overview; Solidworks; 2015.
Retrieved from: http://www.gom.com/fileadmin/user_upload/industries/touch_probe_fixtures_EN.pdf; Application Example: Quality Control, Online Calibration and Validation of Fixtures, Jigs and Gauges. GOM mbH, 2008.
http://citeseerx.ist.psu.edu/viewdoc/download?doi=10.1.1.194.7785&rep=rep1&type=pdf Kim, Jin Baek, and Arie Segev. "A web services-enabled marketplace architecture for negotiation process management." Decision Support Systems 40.1 (2005): 71-87.
Jaiswal, Ashutosh et al., "Design and Implementation of a Secure Multi-Agent Marketplace", Elsevier Science, pp. 1-23, Jun. 3, 2004; http://magnet.cs.umn.edu/papers/Jaiswal04cera.pdf.
http://www.computer.org/csdl/proceedings/hicss/2005/2268/01/22680038.pdf Bui, Tung, and Alexandre Gachet. "Web services for negotiation and bargaining in electronic markets: Design requirements and implementation framework." System Sciences, 2005. HICSS'05.
http://www.bridgelinedigital.com/File%20Library/Repository/eCommerce/Sample-eCommerce-RFP-Template_Bridgeline-Digital.pdf. Sample RFP Template: Ecommerce Platform, Bridgeline Digital, 2014.
Matchbook, Tealbook, http://www.matchbookinc.com/ Sep. 28, 2015.
3Diligent, Source Smarter, http://www.3diligent.com/customer.html; Sep. 28, 2015.
Xue, S., X. Y. Kou, and S. T. Tan. "Natural voice-enabled CAD: modeling via natural discourse." Computer-Aided Design and Applications 6.1 (2009): 125-136.
Kou, X. Y., S. K. Xue, and S. T. Tan. "Knowledge-guided inference for voice-enabled CAD." Computer-Aided Design 42.6 (2010): 545-557.
Sharma, Anirudh, et al. "MozArt: a multimodal interface for conceptual 3D modeling." Proceedings of the 13th international conference on multimodal interfaces. ACM, 2011.
Sorpas ("User Manual,", Swanted Software and Engineering Aps, 2011 (120 pages)).
U.S. Appl. No. 14/267,447, Aug. 5, 2015, Office Action.
U.S. Appl. No. 14/197,922, Nov. 26, 2014, Office Action.
U.S. Appl. No. 14/197,922, Apr. 27, 2015, Response to Office Action.
U.S. Appl. No. 14/197,922, May 15, 2015, Office Action.
U.S. Appl. No. 14/267,447, Jun. 18, 2015, Response to Office Action.
U.S. Appl. No. 14/263,665, Oct. 8, 2015, Office Action.
U.S. Appl. No. 14/053,222, Jan. 29, 2016, Office Action.
U.S. Appl. No. 14/311,943, Apr. 27, 2016, Office Action.
U.S. Appl. No. 14/486,550, May 26, 2016, Office Action.
U.S. Appl. No. 14/060,033, Jun. 15, 2016, Office Action.
U.S. Appl. No. 14/172,462, Jul. 6, 2016, Office Action.
U.S. Appl. No. 14/053,222, Jul. 29, 2016, Response to Office Action.
U.S. Appl. No. 14/185,204, Jul. 29, 2016, Office Action.
U.S. Appl. No. 14/062,947, Sep. 16, 2016, Office Action.
U.S. Appl. No. 14/060,033, filed Oct. 22, 2013.
U.S. Appl. No. 14/053,222, filed Oct. 14, 2013.
U.S. Appl. No. 14/172,462, filed Oct. 16, 2013.
U.S. Appl. No. 14/062,947, filed Oct. 25, 2013.
U.S. Appl. No. 14/172,404, filed Feb. 4, 2014.
U.S. Appl. No. 14/303,372, filed Jun. 12, 2014.
U.S. Appl. No. 14/185,204, filed Feb. 20, 2014.
U.S. Appl. No. 14/195,391, filed Mar. 3, 2014.
U.S. Appl. No. 14/246,254, filed Apr. 7, 2014.
U.S. Appl. No. 14/229,008, filed Mar. 28, 2014.
U.S. Appl. No. 14/197,922, filed Mar. 5, 2014.
U.S. Appl. No. 14/263,665, filed Apr. 28, 2014.
U.S. Appl. No. 14/267,447, filed May 1, 2014.
U.S. Appl. No. 14/311,943, filed Jun. 23, 2014.

* cited by examiner

FIG. 4

Part Mark Pricing Input Data 400

| Part Marking Process | Engineering Fee | Setup Time (hours) | Run Time (hours) | Cost Per Hour |
|---|---|---|---|---|
| Stencil | $125 | .5 | .033 | $150 |
| Laser Etch | $200 | .25 | .008 | $88 |
| ↙ 404A | ↙ 404B | ↙ 404C | ↙ 404D | ↙ 404E |

PLACEMENT AND PRICING OF PART MARKS IN COMPUTER-MODELED STRUCTURES

FIELD OF THE INVENTION

The present invention generally relates to the field of computer-aided design. In particular, the present invention is directed to placement and pricing of part marks in computer-modeled structures.

BACKGROUND

Computer-aided design (CAD) software enables designers to place markings on manufactured parts or assemblies (i.e., structures) represented by computer models. Markings may contain information such as part number, revision, part approval information, font type, font size, label size, or label type. Traditionally, markings were specified in the form of symbols or notes placed in dedicated areas of a 2D design document, such as a blueprint, specifying in detail the correct text and writing process. Deciphering these specialized symbols or notes and then correctly locating and applying the part markings add significant time and expense to the manufacturing process. Currently, CAD programs allow designers to create markings using images of text or graphics. However, CAD programs do not specifically identify or embed these images of part markings and the associated data as part of the CAD model structure. Therefore there is no way to extract part markings from the CAD model, without manual intervention, so that they can be analyzed by and included in the instant electronic pricing of the CAD model.

SUMMARY OF THE DISCLOSURE

In an implementation, the present disclosure is directed to a method of marking a part in a computer aided design (CAD) program operable on a computer system, the part having information associated therewith, the method being executed using a part-marking software tool that allows a user to provide a part with a mark at a selected location and including receiving a first command from the user, wherein the first command identifies a first location on the part that should receive the mark; receiving a second command from the user, wherein the second command dictates at least one attribute of the mark; and modifying information associated with the part to include the first location of the part and the at least one attribute of the mark.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 4 is a table of part mark pricing input data that may be included in a pricing database according to an embodiment of the invention;

DETAILED DESCRIPTION

Aspects of the present invention include systems, methods, and software for placing, customizing, and pricing part marks for use in one or more part designs that are represented in a computer model. Placement may be performed as a function of particular locations of part designs. Users may customize part marks by determining particular attributes thereof, such as textual content, font, and/or manufacturing method, among others. A user may manipulate a graphical user interface (GUI) in order to determine various attributes that further define part mark. Pricing may be performed as a function of user-determined attributes and/or data from one or more pricing algorithms. A part design may be an object or part with a particular geometry, while a computer model may be a virtual representation of a part design and may be created using one or more appropriate CAD programs. Examples of a part design include a piece of sheet metal, a solid cube, a cylindrical pipe, and an assembly of various parts such as a vehicle, among others.

Figure 1:
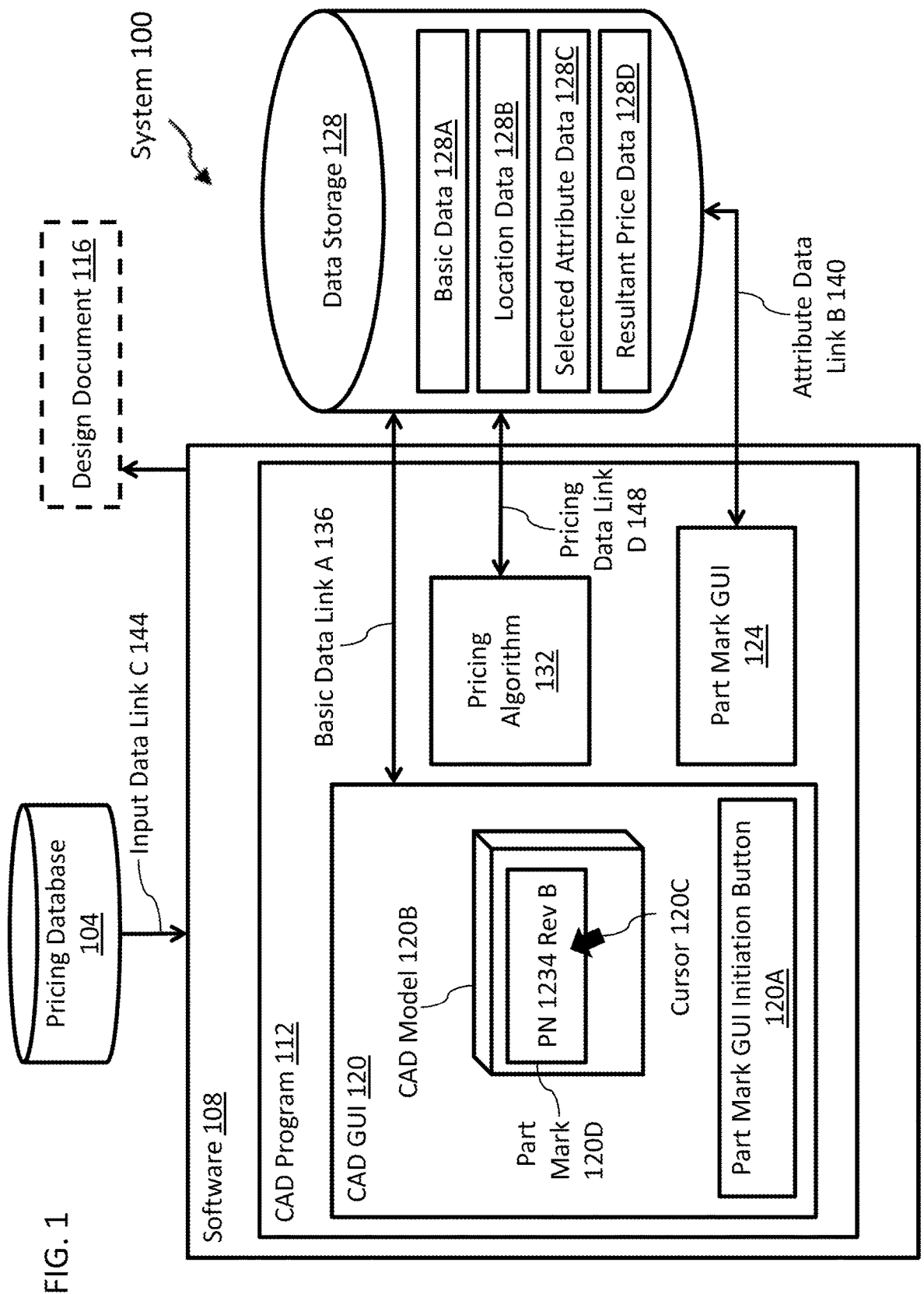
FIG. 1 is a block diagram illustrating an exemplary system for placing, customizing, and pricing a part mark design on a computer model.

FIG. 1 illustrates an exemplary part marking and pricing system 100 made in accordance with the present invention. In this example, part marking and pricing system 100 may be used for placing, customizing, and pricing a part mark design on a computer model. In the embodiment shown, part marking and pricing system 100 includes a pricing database 104 of standard part marking methods, such as laser etching, computer numerical control (CNC) machining, and/or stenciling, among others. Pricing database 104 may contain data usable for pricing a part mark and may be stored locally or remotely relative to other elements of system 100. For example, pricing database 104 may be stored on a server, a hard drive, a CD, a flash drive, in cloud storage, or in any other type of storage accessible by software 108 of system 100.

In this embodiment, software 108 is a virtual software platform for running various programs and algorithms that may be included in part marking system 100. One example of software 108 that may be included in part marking system 100 is CAD program 112. CAD program 112 enables a user to design virtual three-dimensional (3D) models and may take the form of any suitable CAD program, for example, the SOLIDWORKS® program, AUTOCAD®, Creo™, etc. CAD program 112 may be stored and/or executed from, for example, a hard drive or server operating internally or externally to a user's computer. CAD program 112 may produce a design document 116, which may contain a record of one or more attributes and one or more prices associated with a part mark. Design document 116 may be, for example, a CAD file including information about the CAD design and any part mark(s) added using one or more of the various methods described herein.

CAD GUI 120 provides a software user interface allowing interaction between a user and CAD program 112, and may include, for example, a display of a computer model, a part mark, options, and/or toolsets, among others. CAD GUI 120 may include a part mark GUI initiation button 120A that a user may select to cause initiation of part mark functionality. CAD GUI 120 may implement GUI initiation button 120A in the form of, for example, a soft-selection button. CAD GUI 120 may further include a CAD model 120B. CAD model 120B may be a 3D model designed within CAD program 112 or another CAD application. CAD Model 120B may also include all part marks and other information normally contained within design document 116, and may be used in place of the design document. Still further, CAD GUI 120 may include a cursor 120C or other user-controllable virtual representation, which may be controlled a user through, for example, a mouse or other pointing device. Cursor 120C allows a user to interact with CAD GUI 120 in order to select features, locations, and/or buttons, among other aspects of CAD GUI 120. CAD GUI 120 may also include a part mark 120D. Part mark 120D may be a virtual representation of a part mark (a label reading "PN 1234 Rev B" in this example) on CAD model 120B and may be, for example, a form of identification such as a company name, a part number, a batch number, a barcode, or a matrix barcode, among others, as determined by a user through the use of a part mark GUI 124.

CAD program 112 may include part mark GUI 124, which may allow a user to determine various attributes associated with part mark 120D (such as the textual content, font, and/or manufacturing method) and/or may display a price based on part mark attributes. Part mark GUI 124 may be implemented in the form of, for example, a pop-up window, a series of text entry fields, drop-down menus, radio buttons, check boxes, or any other suitable interface for allowing a user to determine attributes of part marks and/or displaying prices based on part mark attributes. Part mark GUI 124 may interact with data storage 128 in order to store attributes associated with part mark 120D.

Part marking and pricing system 100 may include data storage 128 in the form of a database or other suitable data structure capable of storing information associated with CAD model 120B, part mark 120D, attributes determined using part mark GUI 124, and/or one or more prices associated with one or more part mark 120D. Data storage 128 may be stored locally or remotely relative to other elements of system 100. For example, data storage 128 may be stored on a server, a hard drive, a CD, a flash drive, in cloud storage, or in any other type of storage accessible by software 108 of system 100. Data storage 128 may comprise basic data 128A, which may include essential data of CAD model 120B such as, for example, geometrical and/or dimensional data, XYZ coordinates, orientation data, and/or material type, among others. Data storage 128 may further comprise location data 128B, which may specify selected location(s) of one or more part mark 120D and may correspond to or be implemented in the form of, for example, one or more XYZ coordinate(s) within CAD model 120B. Data storage 128 may further include selected attribute data 128C, which may specify attributes selected by a user within part mark GUI 124 and may include, for example, textual content, font, and/or quantity of parts, among others, or may include a picture of the part mark in any standard digital image format, such as jpeg or pdf, among others. Data storage 128 may also include resultant price data 128D. Resultant price data 128D may correspond to a price calculated by a pricing algorithm 132 as a function of one or more of pricing database 104 and selected attribute data 128C. CAD program may include pricing algorithm 132. Pricing algorithm 132 may use inputs from pricing database 104 and selected attribute data 128C to generate resultant price data 128D.

In order to provide communication links between the various components of system 100, the system may provide a number of data links in one or more of various forms, such as an Internet connection, a local network connection, or any other suitable connection for providing communication between the various components of system 100. For example, system 100 may provide a basic data link A 136 between CAD GUI 120 and data storage 128 in order to enable communication of at least basic data 128A. System 100 may also provide an attribute data link B 140 between part mark GUI 124 and data storage 128 in order to enable communication of at least selected attribute data 128C. Additionally, system 100 may provide an input data link C 144 between pricing database 104 and software 108 such that pricing algorithm 132 may interact with and draw data from pricing database 104. System 100 may also provide a pricing data link D 148 between pricing algorithm 132 and data storage 128 in order to enable communication of at least resultant price data 128D.

Figure 2:
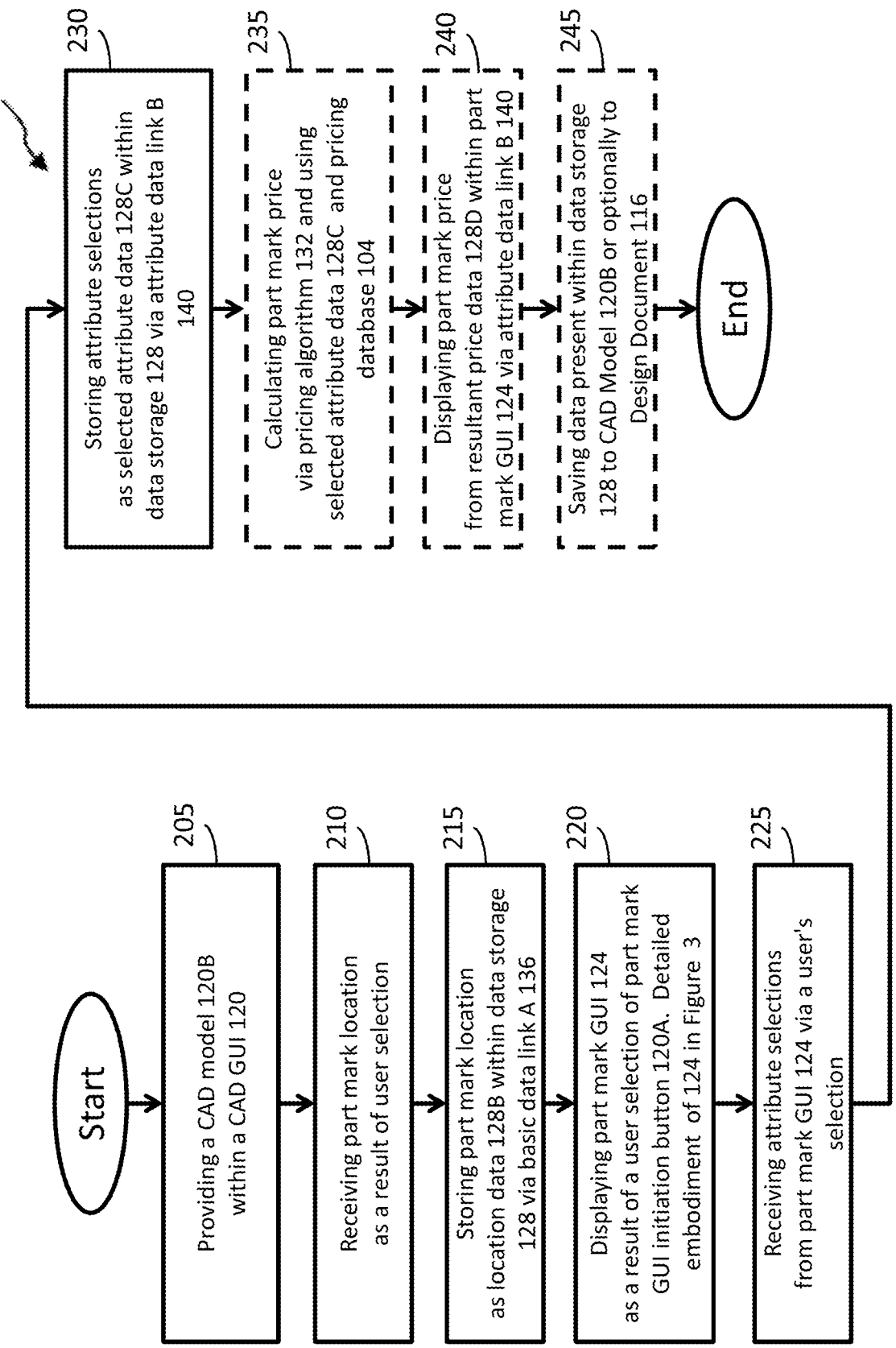
FIG. 2 is a flow diagram of a method for incorporating part marking, machine operations, and associated prices into a CAD file.

With reference to FIG. 2 and continued reference to FIG. 1, a method 200 by which a user may operate system 100 to incorporate part marking, machine operations, and associated prices into a CAD file will now be described. At step 205, a CAD model, such as CAD model 120B, may be provided within a CAD GUI, such as CAD GUI 120. For example, a user may design computer model 120B using CAD program 112 or import computer model 120B from basic data 128A within data storage 128 via data link A 136. Computer model 120B may represent, for example, a sheet metal structure. At step 210, software 108 may receive a location of part mark 120D through user input such as, for example, cursor 120C manipulation/clicking relative to computer model 120B. Software 108 may receive a location of part mark 120D from a user through, for example, user interaction with CAD GUI 120.

At step 215, system 100 may store the location of part mark 120D as location data 128B and the geometrical data associated with computer model 120B as basic data 128A, both within data storage 128, via basic data link A 136. At step 220, a user may select part mark GUI initiation button 120A within CAD GUI 120, which may cause system 100 to display part mark GUI 124. At step 225, system 100 may receive attribute specifications from a user that further define part mark 120D via user interaction with part mark GUI 124. At step 230, system 100 may store attribute specifications as selected attribute data 128C within data storage 128 via attribute data link B 140. At step 235, optionally pricing algorithm 132 may calculate a part mark price as a function of selected attribute data 128C and/or input data within pricing database 104.

At step 240, optionally system 100 may display a calculated part mark price within part mark GUI 124 as a function of resultant price data 128D within data storage 128 and communicated via attribute data link B 140. At step 245, optionally system 100 may save or send design document 116 to a hard drive or server operating internally or externally to a user's computer. Design document 116 may contain, for example, a final CAD file containing basic data 128A of a computer model 120B, location data 128B of a part mark 120D, selected attribute data 128C, and resultant price data 128D; in the alternative, CAD Model 120B may contain all necessary data and be saved or sent in lieu of design document 116 It is particularly emphasized that the order of performance of the foregoing steps of method 200 need not be as shown. Rather, they may be implemented in any logical order that results in an appropriate generation of design document 116.

Figure 3:
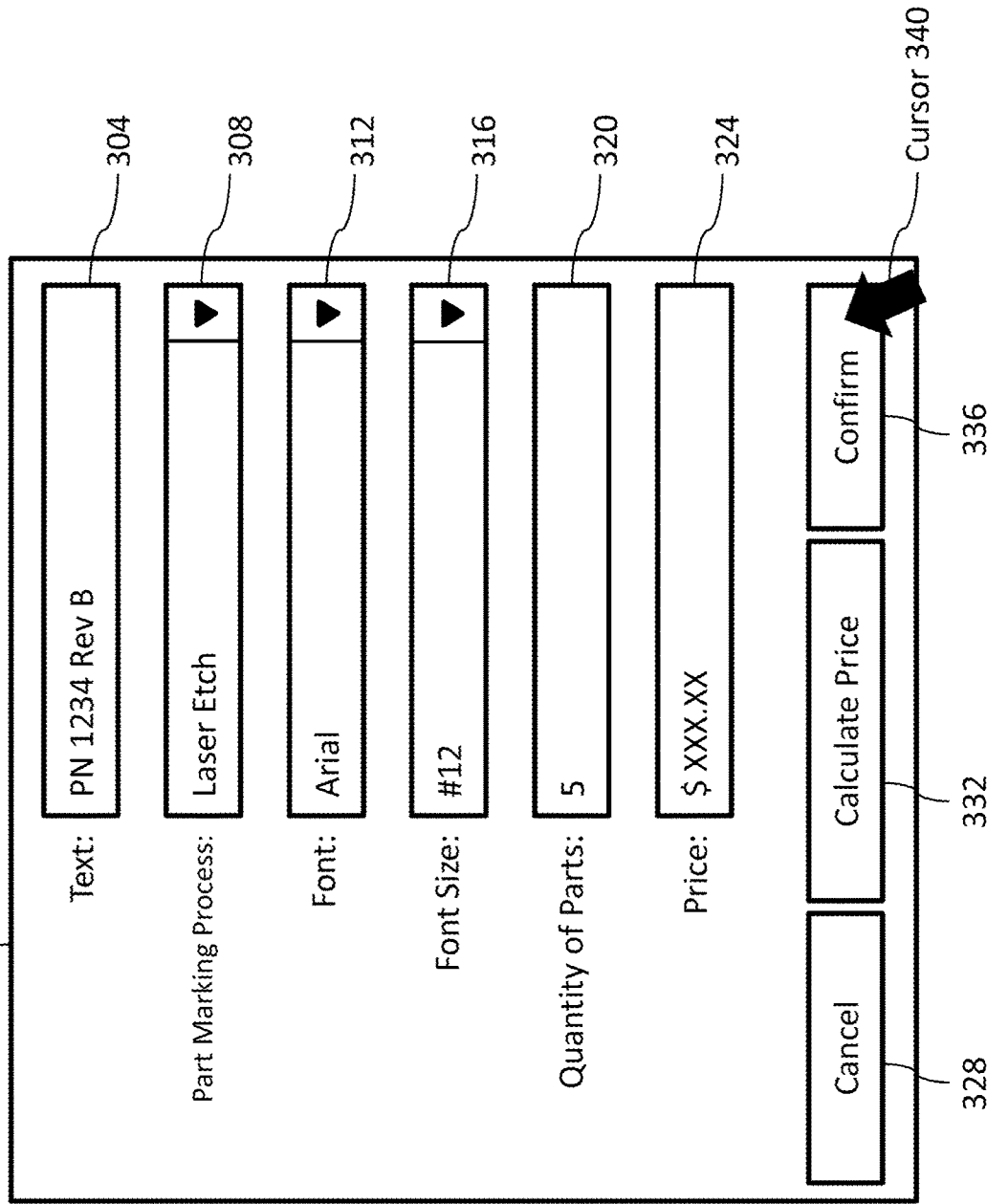
FIG. 3 is a representational screenshot of a part mark interface for allowing a user to determine various attributes of a part mark design and for displaying one or more prices associated with one or more part mark design attributes to a user.

FIG. 3 illustrates an exemplary part mark GUI 300. Part mark GUI 300 may include a text entry field 304, which may enable a user to input textual content of part mark 120D. Textual content may be, for example, a word or series of words, part names or numbers, or any other text a user wishes to associate with part mark 120D (a label reading "PN 1324 Rev B" in this example). Though not explicitly shown in FIG. 3, in addition to text entry field 304, part mark GUI 300 may further include functionality, such as a button or text entry field, to enable a user to import and optionally crop or otherwise select particular features within graphical files and/or other CAD files, at least a portion of which a user desires to use as at least a portion of a part mark. Part mark GUI 300 may further include a part marking process input 308, such as a drop-down menu, allowing a user to choose one or more particular manufacturing methods that should or could be used to manufacture part mark 120D and associated text entered through text entry field 304. Part marking process input 308 may provide, for example, a choice between various manufacturing methods, such as laser etching, machining, and/or stenciling, among others. In one embodiment, pricing algorithm 132 may calculate resultant price data 128D using information provided by a user through part marking process input 308.

Part mark GUI 300 may further include a font input 312, such as a drop-down menu or text entry field, allowing a user to choose a particular font/style to apply to text entered through text entry field 304 when system 100 applies part mark 120D to computer model 120B and/or when manufacturing/fabricating part mark 120D. Users may select and/or specify font inputs or selection options through font input 312 such as any of various known fonts and/or styles; for example, a user may specify an italic or bold ARIAL® font through font input 312. Part mark GUI 300 may also include a font size input 316, such as a drop-down menu, text entry field, or slider, enabling a user to specify one or more particular font sizes to use for text entered through text entry field 304 when system 100 applies part mark 120D to computer model 120B and/or when manufacturing/fabricating part mark 120D. A user may specify size inputs or selection options through font size input 316 such as, for example, one or more particular font size(s) and/or a range of font sizes, such as 6, 8, 6-8, or 14 for one subset of characters of part mark 120D and 12 for a separate subset of characters of part mark 120D. If a user provides a range of font sizes through font size input 316, a manufacturer may fabricate part mark 120D using a gradient of font sizes (i.e., first character 6, second character 6.5, third character 7, fourth character 7.5, etc.) or using a single font size within the provided range and chosen at the discretion of the manufacturer.

Part mark GUI 300 may also include a quantity of parts input 320, such as a drop-down menu, text-entry field, or slider, enabling a user to input a desired number of parts to be manufactured, which may include a number of structures corresponding to computer model 120B to be manufactured and/or a number of part marks 120D to apply to to-be-fabricated or already-fabricated structures corresponding to computer model 120B. User inputs or selection options that may be specified through quantity of parts input 320 may include, for example, integers such as 1, 5, and/or 100, and, though not explicitly shown, part mark GUI 300 may provide separate inputs such that a user may specify different quantities of structures to manufacture and part marks 120D to apply. For example, a user may specify through part mark GUI 300 that a manufacturer should produce 250 parts and should apply part marks 120D to 150 of those 250 parts. In one embodiment, pricing algorithm 132 may calculate resultant price data 128D using information provided by a user through quantity of parts input 320. Part mark GUI 300 may additionally include a price display field 324, which system 100 may control to display a price associated with one or more attributes of a particular part or part mark 120D and/or one or more attributes selected in part mark GUI 300.

Part mark GUI 300 may provide a number of buttons implemented as, for example, soft-selection buttons, to enable a user to interact with part mark GUI 300. For example, a cancel button 328 may be provided to enable a user to close part mark GUI 300 when selected/clicked. In addition, selecting cancel button 328 may cause system 100 to delete or revert to previous values/states any selected attribute data 128C stored while utilizing a current instantiation of part mark GUI 300. Part mark GUI 300 may also include a calculate price button 332 to enable a user to cause system 100 to store attributes selected or otherwise specified within part mark GUI 300 within selected attribute data 128C and to update price display field 324. Part mark GUI 300 may additionally include a confirm button 336 enabling users to cause part mark GUI 300 to close without deleting or reverting selected attribute data 128C. Cursor 340 allows a user to interact with part mark GUI 300 to select menus, prompts, inputs, and/or buttons, among other aspects of part mark GUI 300.

FIG. 4 illustrates exemplary part mark pricing input data 400 that may be stored within pricing database 104 according to an embodiment of the invention. Part marking process column 404A of part mark pricing input data 400 may contain a number of various part marking manufacturing methods that part mark GUI 300 may present in association with part marking process input 308 in FIG. 3 such as, for example, laser etching, machining, and/or stenciling, among others. Engineering fee column 404B of part mark pricing input data 400 may contain one-time fees associated with various costs of preparing a particular part marking process 404A for a particular part mark 120D. For example, engineering fee column 404B may contain charges related to programming costs associated with stenciling or laser etching or the creation of a stencil when using stenciling, among others. Pricing algorithm 132 may use the contents of engineering fee column 404B in calculating resultant price data 128D of part mark 120D. Setup time column 404C of part mark pricing input data 400 may contain various estimated lengths of time a manufacturer would need to arrange for a part to be marked. Amounts of time in setup time column 404C may vary as a function of selected part marking process 404A and pricing algorithm 132 may utilize values in setup time column 404C in calculating resultant price data 128D of one or more part marks 120D.

Part mark pricing input data 400 may also include a run time column 404D, which may specify amounts of time estimated to be required for a manufacturer to fabricate part mark 120D using a corresponding associated part marking process 404A. Run time column 404D may specify, for example, an amount of time that varies as a function of selected part marking process 404A and pricing algorithm 132 may utilize values in run time column 404D in calculating resultant price data 128D of one or more part marks 120D. Part mark pricing input data 400 may additionally include a cost per hour column 404E containing actual or estimated hourly rates associated with one or both of corresponding values in setup time column 404C and/or run time column 404D. Cost per hour column 404E may contain costs that vary as a function of selected part marking process 404A, and pricing algorithm 132 may utilize values in cost per hour column 404E in calculating resultant price data 128D of one or more part marks 120D. Though part mark pricing input data has been described in terms of columns in a table in the context of FIG. 4, part mark pricing input data 400 may be stored within pricing database 104 in any suitable fashion using any suitable data type(s) that allows software 108 to interact with pricing database 104 to perform one or more of the various functions described herein.

Figure 5:
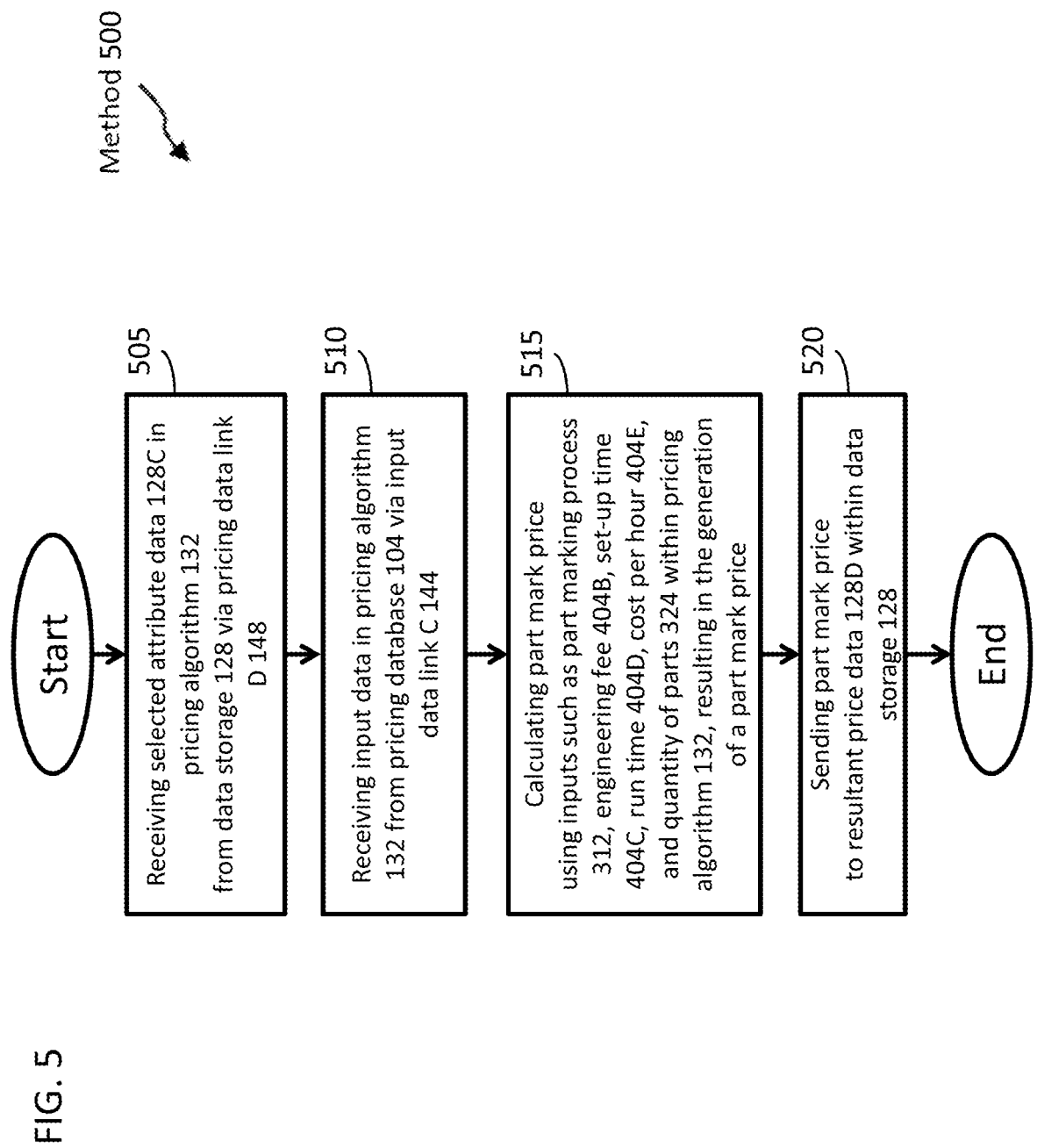
FIG. 5 is a flow diagram of a method for calculating the cost of a part mark and associated manufacturing methods.

FIG. 5 illustrates a pricing calculation method 500 that can implement method step 235 and/or pricing algorithm 132. At step 505, system 100 may retrieve selected attribute data 128C from within data storage 128 via pricing data link D 148. At step 510, system 100 may retrieve input data from within pricing database 104 via input data link C 144. At step 515, system 100 may calculate a part mark price as a function of one or more inputs, which may be provided by a user through, for example, part marking process input 308 and/or quantity of parts input 320, and/or provided by pricing database 104, such as engineering fee column 404B, setup time column 404C, run time column 404D, and/or cost per hour column 404E. According to an embodiment, calculation of part mark price may be accomplished using the following equation: total price=(engineering fee 404B)+(setup time 404C multiplied by cost per hour 404E)+(run time 404D multiplied by cost per hour 404E and further multiplied by user input provided through quantity of parts input 320). For example, in accordance with data provided in FIGS. 3 and 4 relative to laser etching, this equation would become: total price=($200)+(0.25 hours multiplied by 88 dollars per hour)+(0.008 hours multiplied by 88 dollars per hour multiplied by 5)=$225.52. At step 520, system 100 may save or send a calculated part mark price to a hard drive or server operating internally or externally to a user's computer and/or store a calculated part mark price as resultant part mark price 128D within data storage 128 via pricing data link D 148. It is particularly emphasized that the order of performance of the foregoing steps of method 500 need not be as shown. Rather, they may be implemented in any logical order that results in determining a part mark price.

It is to be noted that any one or more of the aspects and embodiments described herein may be conveniently implemented using one or more machines (e.g., one or more computing devices that are utilized as a user computing device for an electronic document, one or more server devices, such as a document server) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk (e.g., a conventional floppy disk, a hard drive disk), an optical disk (e.g., a compact disk "CD", such as a readable, writeable, and/or re-writable CD; a digital video disk "DVD", such as a readable, writeable, and/or rewritable DVD), a magneto-optical disk, a read-only memory "ROM" device, a random access memory "RAM" device, a magnetic card, an optical card, a solid-state memory device (e.g., a flash memory), an EPROM, an EEPROM, and any combinations thereof. A machine-readable medium, as used herein, is intended to include a single medium as well as a collection of physically separate media, such as, for example, a collection of compact disks or one or more hard disk drives in combination with a computer memory. As used herein, a machine-readable storage medium does not include a signal.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a personal digital assistant "PDA", a mobile telephone, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 6:
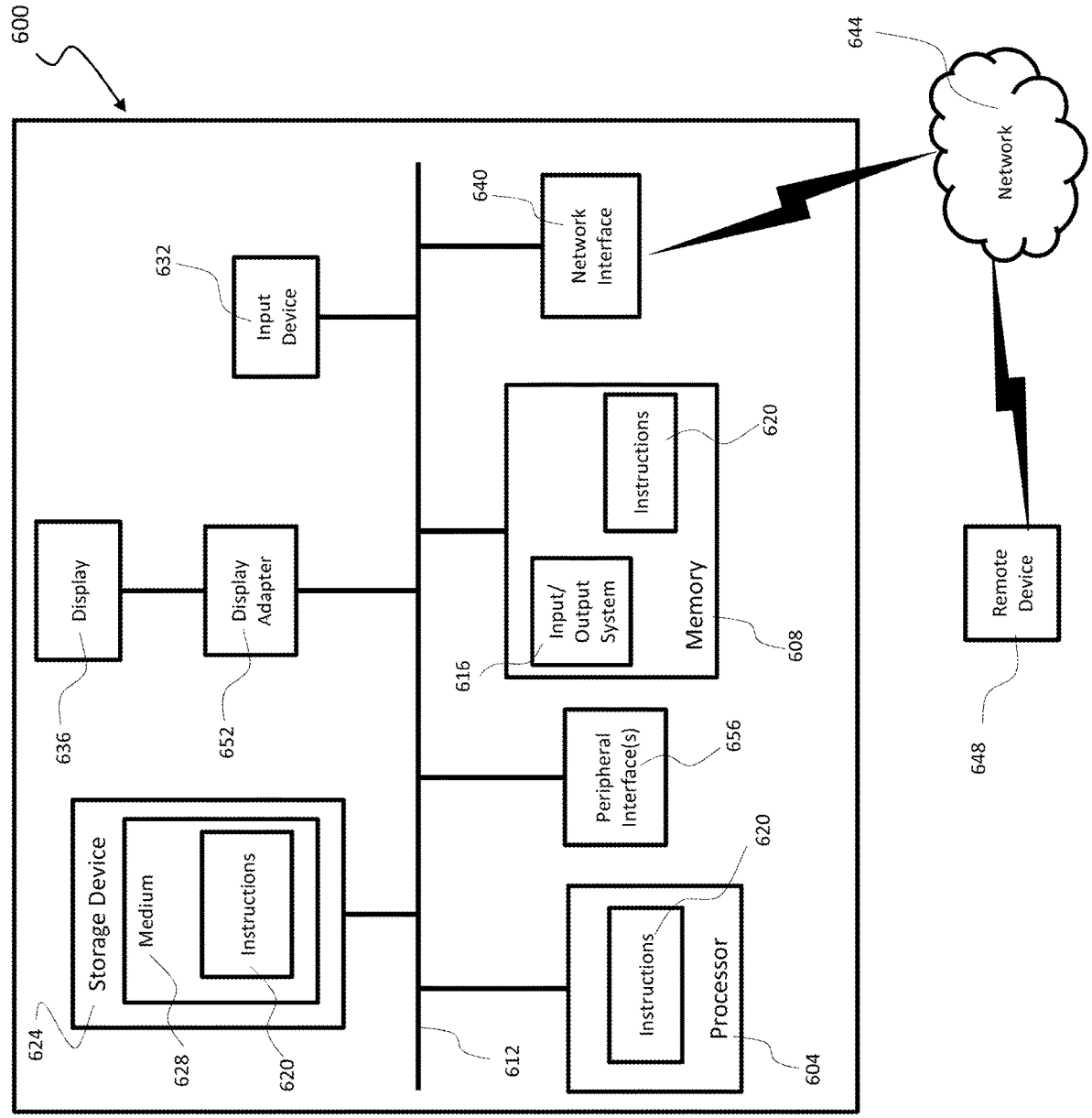
FIG. 6 is a block diagram of a computing system that can be used to implement any one or more of the methodologies disclosed herein or any portion(s) thereof.

FIG. 6 shows a diagrammatic representation of one embodiment of a computing device in the exemplary form of a computer system 600 within which a set of instructions for causing a control system, such as the compatible components system of FIG. 1, to perform any one or more of the aspects and/or methodologies of the present disclosure may be executed. It is also contemplated that multiple computing devices may be utilized to implement a specially configured set of instructions for causing the device to perform any one or more of the aspects and/or methodologies of the present disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Memory 608 may include various components (e.g., machine readable media) including, but not limited to, a random access memory component (e.g., a static RAM "SRAM", a dynamic RAM "DRAM", etc.), a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Computer system 600 may also include a storage device 624. Examples of a storage device (e.g., storage device 624) include, but are not limited to, a hard disk drive for reading from and/or writing to a hard disk, a magnetic disk drive for reading from and/or writing to a removable magnetic disk, an optical disk drive for reading from and/or writing to an optical medium (e.g., a CD, a DVD, etc.), a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1244 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within processor 604.

Computer system 600 may also include an input device 632. In one example, a user of computer system 600 may enter commands and/or other information into computer system 600 via input device 632. Examples of an input device 632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), touchscreen, and any combinations thereof. Input device 632 may be interfaced to bus 612 via any of a variety of interfaces (not shown) including, but not limited to, a serial interface, a parallel interface, a game port, a USB interface, a FIREWIRE interface, a direct interface to bus 612, and any combinations thereof. Input device 632 may include a touch screen interface that may be a part of or separate from display 636, discussed further below. Input device 632 may be utilized as a user selection device for selecting one or more graphical representations in a graphical interface as described above.

A user may also input commands and/or other information to computer system 600 via storage device 624 (e.g., a removable disk drive, a flash drive, etc.) and/or network interface device 640. A network interface device, such as network interface device 640 may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with processor 604 to provide graphical representations of aspects of the present disclosure. In addition to a display device, a computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. Additionally, although the methods herein have been illustrated as being performed in a specific order, the ordering is highly variable within ordinary skill to achieve the methods, systems, and software for placing, customizing, and pricing part marks for use in one or more part designs that are represented in a computer model described herein. Accordingly, this description is meant to be taken only by way of example, and not to otherwise limit the scope of this invention.

What is claimed is:

1. A method of marking a part in a computer aided design (CAD) program associated with a graphical user interface (GUI) and operable on a computer system, the part having information associated therewith, the method being executed using a part-marking software tool that allows a user to provide a part with a mark at a selected location and comprising:

receiving a first command from the user via the GUI associated with the CAD program, wherein the part is represented in a CAD model stored in a CAD file, the CAD model having a coordinate system, and the first command identifies a first location, corresponding to one or more coordinates within the CAD model, on the part that should receive the mark;

receiving a second command from the user via the GUI associated with the CAD program, wherein the second command instructs the computer system to create the mark;

displaying to the user a part mark GUI, wherein displaying the part mark GUI further comprises:

displaying a text entry field that enables the user to input textual content of the mark; and displaying a part marking process input including a drop-down menu allowing a user to choose one of a plurality of manufacturing methods for manufacturing the mark, the plurality of manufacturing methods including etching, computer numerical control machining, and stenciling;

receiving a third command from the user via the part mark GUI, wherein the third command dictates at least one attribute of the mark, the attribute comprising a manufacturing method for creating the mark, the manufacturing method comprising etching, computer numerical control machining, or stenciling, and wherein the user selects the manufacturing method using the part marking process input;

retrieving, from a database via the part mark GUI, a run time associated with the selected manufacturing method for creating the mark on the part in response to receiving the third command, wherein the selected manufacturing method for creating the mark on the part comprises stenciling;

receiving a fourth command from the user via the part mark GUI, wherein the fourth command further comprises textual content of the mark, wherein the user selects the textual content of the mark using the text entry field;

determining, using a pricing algorithm included in the CAD program, a price for the mark as a function of the retrieved run time for creating the mark on the part and the textual content of the mark, wherein the price for the mark includes at least a charge for a programming cost associated with the stenciling and at least a charge for creation of a stencil associated with the textual content;

modifying the CAD file to include the first location on the part, the manufacturing method, the price for the mark, and the textual content; and producing a design document, wherein the design document includes one or more elements of data associated with the CAD model and the mark.

2. A method according to claim 1, further comprising receiving a fifth command from the user, wherein the fifth command moves the mark from the first location to a second location on the part.

3. A method according to claim 1, further comprising displaying the price to the user.

4. A method according to claim 3, wherein said determining a price comprises calculating the sum of:
an engineering fee determined as a function of the at least one attribute;
the product of a setup time and a setup cost per hour; and
the product of a run time and a cost per hour.

5. The method of claim 1 further comprising:
receiving a fifth command from the user via the part mark GUI, wherein the fifth command selects a graphical feature to include in the mark; and
modifying the CAD file to include at least a portion of the graphical feature.

6. The method of claim 5, wherein the CAD file is a first CAD file, and wherein the graphical feature is a graphical feature of a second CAD file.

7. The method of claim 1 further comprising receiving a fifth command from the user via the part mark GUI, wherein the fifth command selects a range of font sizes for the textual content, wherein the range of font sizes includes a plurality of font sizes from which a manufacturer may select a font size at which to manufacture the mark.

8. The method of claim 1 further comprising:
providing, via the part mark GUI, a quantity of parts input; and
receiving from the user and via the quantity of parts input a first quantity of parts to which the mark is to be applied by a manufacturer.

9. The method of claim 8 further comprising receiving from the user and via the quantity of parts input a second quantity of parts to be manufactured by the manufacturer, wherein the first quantity differs from the second quantity.

10. The method of claim 1 further comprising:
retrieving, from a database associating pricing data with manufacturing methods, pricing data associated with the manufacturing method for creating the mark;
calculating, as a function of the pricing data, a part mark price; and
displaying, in the part mark GUI, the part mark price.

11. The method of claim 4 further comprising retrieving, from a database relating manufacturing methods to setup times, the setup time as a function of the manufacturing method for creating the mark.

12. The method of claim 1, wherein the method further comprises communicating with a pricing database to access part mark pricing input data.

13. The method of claim 1, wherein the mark further comprises a barcode identification.

14. The method of claim 13, wherein the CAD model represents a sheet metal structure.

15. The method of claim 14, wherein the part mark GUI further includes a quantity of parts input in the form of a slider.

16. The method of claim 1, wherein the CAD model includes a representation an assembly of a plurality of parts.

17. The method of claim 16, wherein the CAD model represents a virtual model of a vehicle including the plurality of parts.

18. The method of claim 17, wherein the part mark GUI further includes a quantity of parts input in the form of a slider.

* * * * *